Jan. 16, 1923.
G. B. EGGERT.
GEARING.
FILED FEB. 24, 1922.
1,442,057.
2 SHEETS—SHEET 1.
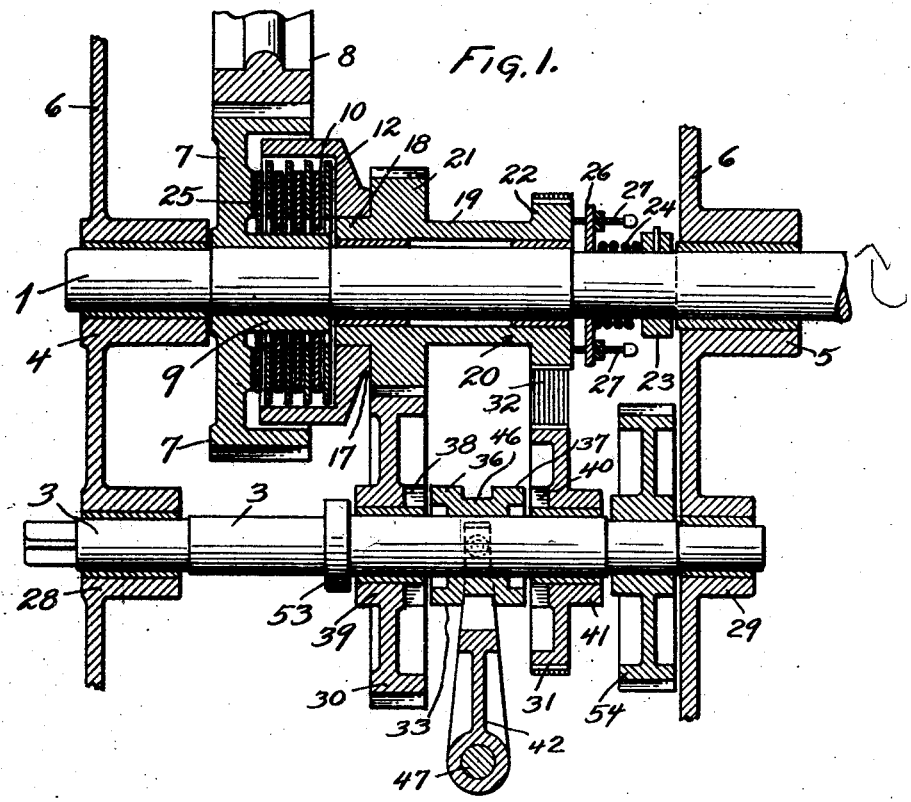
Inventor:
Gustav Bernhard Eggert.

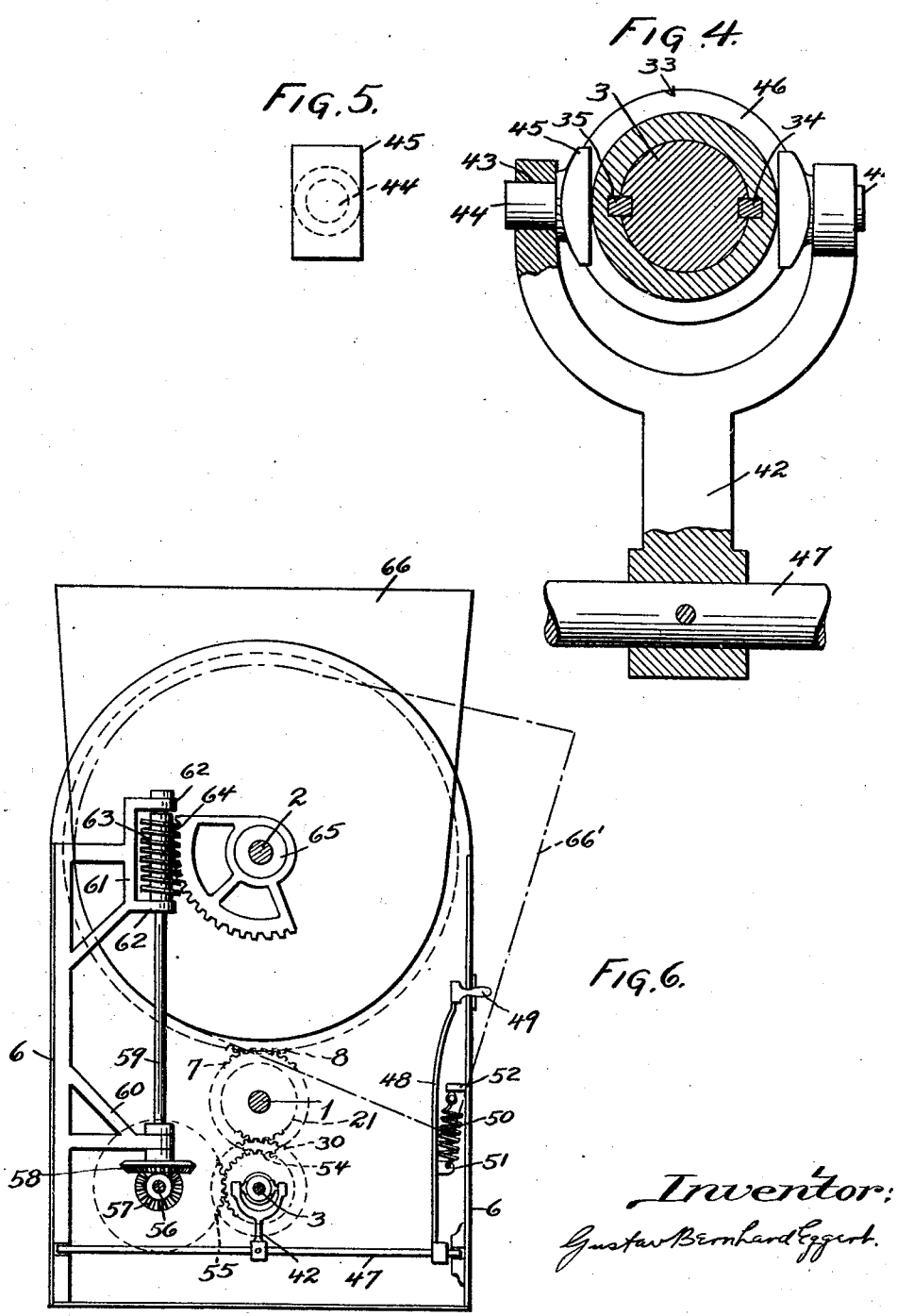

UNITED STATES PATENT OFFICE.

GUSTAV BERNHARD EGGERT, OF SAGINAW, MICHIGAN, ASSIGNOR TO BAKER-PERKINS MANUFACTURING CORPORATION, OF SAGINAW, MICHIGAN.

GEARING.

Application filed February 24, 1922. Serial No. 538,866.

*To all whom it may concern:*

Be it known that I, GUSTAV BERNHARD EGGERT, a citizen of the United States, residing at Saginaw, in the county of Saginaw and State of Michigan, have invented new and useful Improvements in Gearings, of which the following is a specification.

My invention relates to gearings transmitting power from a main driving shaft to a counter shaft requiring from the latter only a comparatively small fraction of its available power, and is especially applicable to reversing gears, for instance those used for the tilting of mixing and kneading machines, in which the operation of the mixing blades may need, say 25 to 30 horsepower, while only one or less is necessary for tilting. The object of my invention is to make the working of such gearings more efficient, exact and safe.

To this end, I mount the wheel, employed in the gearing for transferring power to the counter shaft, loosely on the main driving shaft, and provide on the latter at one side of this wheel a friction clutch and at its opposite side a spring held in position against the wheel by a collar or any other suitable contrivance fixed to the main driving shaft. I arrange this spring to be of such a strength that the friction, produced in the clutch by its pressure against the loose wheel, attaches the latter to the main driving shaft with a force only sufficient for it to transfer to the counter shaft the maximum amount of power necessary for the operation of the apparatus which the latter has to drive, and that therefore, when an obstacle in the working of this apparatus occurs, the so much greater power inherent in the main driving shaft will overcome the amount of friction in the clutch, the gear wheel will be disconnected from the main driving shaft and arrested, the counter shaft will stop, and thus any possible damage to the apparatus will be prevented.

For reversing the action of the counter shaft, I insert between the friction clutch and the spring a double gear consisting of a solid hub loosely mounted on the driving shaft and carrying at one end a gear wheel, meshing with a gear wheel revolubly mounted on the counter shaft, and at the opposite end a sprocket wheel working by means of an endless chain a corresponding sprocket wheel loosely mounted on the same counter shaft; a double clutch is provided on the latter between the gear wheel and the sprocket wheel mounted thereon. Thus, when the double clutch grips into the former, the counter shaft will move in one direction, and when into the latter, in the opposite direction, while the power transmitted is limited as described.

The accompanying drawings serve to further illustrate my invention and represent as example of its application the gearing used for tilting a mixing and kneading machine.

Fig. 1 shows the arrangement of the gearing, of the friction clutch and of the spring on the driving shaft, and that of the corresponding gearing and the double clutch on the counter shaft in their relation to each other.

Fig. 2 and Fig. 3 illustrate details of the friction clutch and their arrangement on the driving shaft.

Fig. 4 is a cross section—vertical to the counter shaft—of the double clutch and of the means by which it is operated; Fig. 5 is a plan of a detail of this clutch.

Fig. 6 represents the application of the devices shown in the previous figures to the tilting gear of a kneading and mixing machine.

In all the figures of the drawings like numerals of reference designate corresponding parts serving the same or similar purposes.

The numeral 1 indicates the main driving shaft, 2 the blade shaft and 3 the counter shaft transmitting to the tilting gear of the kneading and mixing machine (Fig. 6) a predetermined limited portion of the total power imparted to the main driving shaft 1 by the engine or electric motor. The shaft 1 revolves in the bearings 4 and 5 contained in the framework 6 supporting the machine and carries rigidly affixed thereto near the bearing 4 the gear wheel 7 meshing with the large gear wheel 8 mounted on the blade shaft 2. The support of the rim of the gear wheel 7 (Fig. 1) is arranged at its side nearest to the bearing 4, and its hub projects in the opposite direction, so that this elongation of the latter forms with the inner surface of that part of the rim overhanging the same a circular cavity, in which the drum 14 may turn. The elongated part 9 of the hub has the shape of an oblong tube, the angular edges of which have been rounded off in such a manner that the circumferences of the rounded parts are situated in one and the same circle coaxial to the shaft 1. The friction discs 10 have square openings 11 fitting over the square portions of the oblong tube 9 and therefore revolve with the gear wheel 7, as long as the driving shaft 1 rotates, while the friction discs 12 have circular openings 13 loosely fitting on the circular portions of the tube 9 and are thus capable of turning round the same. The friction discs 10 and 12 are alternately arranged on the latter and enclosed in the drum 14. The discs 10 have so small a diameter and are so arranged that they are not touched and cannot be interfered with by any part of the drum 14, while the discs 12 are provided at their outer edges with the oblong projections 15, corresponding to similar oblong sections 16 protruding from the inner side of the cylindrical part of the drum 14, so that these discs can only move side wise and are forced to rotate with the latter. The neck 17 of the drum 14 is attached to the flange 18 projecting from the hub 19 of the double gear 20 revolubly mounted on the shaft 1 and consisting of the gear wheel 21 and the sprocket wheel 22 situated, the former near the drum 14 and the latter near the opposite end of the hub 19. At the side of the latter end of the hub 19 the shaft 1 is surrounded by the spring 24 and provided with the collar 23 for holding the latter in position against the hub 19. The collar 23 is fixed to the shaft 1 at such a distance from the hub 19, and the spring 24 is of such a strength, that the latter presses with the required force the drum 14 carried by the double gear 20 against the first friction disc 12, then the consecutive and alternate discs 12 and 10 against each other, and the last disc 10 against the projection 25 provided at the side of the gear wheel 7. Thus, the double gearing 20 will revolve with the shaft 1, until the amount of friction between the discs 10 and 12, caused by the pressure of the spring 24, has been overcome. For regulating this pressure, the annular disc 26 is arranged between the spring 24 and the hub 19 and provided with the screws 27, the tips of which rest on the side of the latter; according to the direction in which these screws are turned, the distance of the disc 26 from the collar 23, and thereby the length and consequent pressure of the spring 24, are regulated.

The counter shaft 3 is revolubly carried by the bearings 28 and 29 provided in the framework 6, and ends outside in an angular head for connecting, when necessary, a crank to turn the shaft by hand. The gear wheel 30, meshing with the gear wheel 21, and the sprocket wheel 31, driven by the sprocket wheel 22 by means of the endless chain 32, are revolubly mounted on the counter shaft 3; between these two wheels the double clutch 33 is arranged so as to attach either the gear wheel 30 or the sprocket wheel 31 to this shaft. For this purpose, the clutch 33, while capable of being moved sidewise, is prevented from turning round the shaft 3 by means of the projections or keys 34 arranged at the circumference of the latter and fitting slidably in grooves 35 cut in the inner circumference of the body of the former, and fitted at one side with the claws 36 and at the opposite side with the claws 37, the claws 36 being adapted to enter into the corresponding sockets 38 provided in the hub 39 of the gear wheel 30, and the claws 37 into the sockets 40 provided in the hub 41 of the sprocket wheel 31. When the clutch 33 is moved towards the latter, and its claws 37 grip into the sockets 40, the counter shaft 3 will be rotated in the same direction as the main driving shaft 1, but in the opposite direction, when the clutch 33 is moved towards the gear wheel 30, and its claws 36 grip into the sockets 38. The double clutch 33 is worked to and fro on the counter shaft 3 by means of the fork 42, the prongs of which are arranged at opposite sides of the former and contain in their upper part suitable openings 43 for holding the stems 44 of the slide shoes 45 sliding in the channel 46 provided round the body of the clutch 33. The shank of the fork 42 points downwards and is fixed with its lower end to the rod 47 rotatably mounted in bearings arranged at the framework 6 of the machine and rigidly connected to the lever 48 pointing upwards and provided at its end with the handle 49 to work the same to and fro as required. In order to retain the double clutch 33 firmly in its zero position, where its claws interfere neither with the gear wheel 30 nor the sprocket wheel 31, and to cause its automatic return into this position, after the tilting operation has been finished, the strong spring 50 is connected with one end to the hook 51 fixed to the lever 48 and with its other end to the bracket 52 arranged vertically above the same at the framework 6. Any possible side movement of the gear wheel 30 and the sprocket wheel 31, revolubly mounted on the counter shaft 3, is prevented by the ring or collar 53 situated alongside the former and by the gear wheel 54 fixed alongside the latter to the shaft 3 and driving the tilting apparatus.

The gear wheel 54 meshes with the gear wheel 55 rigidly mounted on the tilting shaft 56, on which the bevel wheel 57 is rigidly mounted. The latter meshes with the bevel wheel 58 fixed to the lower end of the vertical shaft 59 which is revolubly supported in the brackets 60 and 61 arranged at the framework 6. The shaft 59 is fitted at its top between the branches 62 of the brackets 61 with the worm 63 meshing with the teeth of the quadrant 64 fixed to the hub 65 coaxially to the blade shaft 2. The hub 65 is bolted to or forms one piece with the trough 66, which is shown in 66* in its tilted position.

When the trough 66 is to be tilted or returned into its upright position, the attendant simply turns the handle 49 in the required direction, thereby straining the spring 50, which, as soon as the handle 49 is released, will draw the clutch 33 back into its inactive position. When the trough 66 or the tilting apparatus encounter during the tilting operation any obstacle, the whole force of the power shaft 1 cannot act upon the same; as soon as the predetermined amount of friction caused by the pressure of the spring 24 has been overcome, the friction discs 12 will not rotate any longer with the discs 10 and the shaft 1, and the drum 14 and the double gear 20 will stop, whereby the whole tilting apparatus will be arrested.

I claim:

1. In a gearing, in combination a driving shaft, a counter shaft requiring from the latter only a small fraction of its available power, a gear wheel revolubly mounted on the said counter shaft, a sprocket wheel revolubly mounted on the said counter shaft at some distance from the former, a double-clutch arranged on the said counter shaft between the said gear wheel and the said sprocket wheel and adapted to attach either the latter or the former to the same, a gear wheel loosely mounted on the said driving shaft and meshing with the said gear wheel on the said counter shaft, a sprocket wheel loosely mounted on the said driving shaft in correspondence to the said sprocket wheel on the said counter shaft, an endless chain running over the two said sprocket wheels, a hub common to both, the gear wheel and sprocket wheel loosely mounted on the said driving shaft, a friction clutch provided at one side of the said hub, and a spring arranged at the opposite side thereof and so adapted that its pressure attaches the said hub to the said driving shaft by means of the said clutch with a force equal to the maximum of the power required for the said counter shaft.

2. In a gearing, in combination a driving shaft, a counter shaft, a hub carrying the wheel employed in the gearing for transmitting power from the said driving shaft to the said counter shaft and revolubly mounted on the former, a flange projecting from one side of the said hub, a drum attached with its narrow neck to the said flange, rectilinear projections provided at the inner surface of the cylindrical part of the said drum, a tube fixed to the said driving shaft and bounded in its circumference by straight planes rounded off at the angles, where they meet, to form part of a cylinder coaxial to the said driving shaft, a wall extending radially from the said tube at its end farthest removed from the said hub, a plurality of discs having in the center an opening, fitting over the straight sections of the said tube so as to allow only a side movement thereon, and a circumference removed from the surface of the said rectangular projections of the said drum so as to turn therein, a plurality of discs having a circular opening loosely fitting over and turning on the circular parts of the said tube and having at its circumference projections fitting to the said rectilinear projections of the said drum so as to allow only a side movement therein, the two sets of discs being arranged alternately on the said tube and within the said drum, and a spring arranged at the opposite side of the said hub and so adapted that it presses the latter and the drum against the said discs and the latter against each other and the said wall and, by the friction thus caused, attaches the said hub and its wheel to the said driving shaft with a force equal to the maximum of the power required for the said counter shaft.

3. In a gearing, in combination a driving shaft, a counter shaft, a wheel employed in the gearing for transmitting power from the said driving shaft to the said counter shaft and revolubly mounted on the former, a friction clutch provided at one side of the said wheel, an annular disc loosely fitting over the said driving shaft and placed at the opposite side of the said wheel, screw-threaded openings arranged in the said annular disc parallel to the said driving shaft, screws fitting in the said screw-threaded openings and resting with their tips on the side of the hub of the said wheel, a collar fixed round the said driving shaft at some distance from the said annular disc, and a spring arranged between the latter and the said collar and so adapted that its pressure, by pushing the said wheel against the said friction clutch, attaches the former to the said driving shaft with a force equal to the maximum of the power required for the said counter shaft, the strength of the said spring being adjusted by the said screws.

4. In a gearing of a mixing and kneading machine, in combination a main driving shaft, a gear wheel fixed thereon and adapted to drive the gearing rotating the blades, a counter shaft, a gear wheel fixed on the latter and adapted to drive the tilting gear, a gear wheel revolubly mounted on the said counter shaft, a sprocket wheel revolubly mounted on the said counter shaft at some distance from the former, a double-clutch arranged on the said counter shaft between the said gear wheel and the said sprocket wheel thereon, and adapted to connect either the latter or the former to the same, a fork and a lever working the said double-clutch, means for keeping the latter in the zero-position, when not in use, a gear wheel loosely mounted on the said main driving shaft and meshing with the said gear wheel on the said counter shaft, a sprocket wheel loosely mounted on the said main driving shaft in correspondence to the said sprocket wheel on the said counter shaft, a chain running over the two said sprocket wheels, a hub common to both the said gear wheel and sprocket wheel loosely mounted on the said main driving shaft, a flange projecting from that side of the said hub pointing towards the said gear wheel fixed to the said main driving shaft, a drum attached with its neck to the said flange, rectilinear projections provided at the inner surface of the cylindrical part of the said drum, an oblong tube projecting from the hub of the last named gear wheel, having cut-off and equally rounded edges and situated within the said drum, a plurality of discs having in the center an opening, loosely fitting over the straight sections of the said tube so as to allow only a side movement thereon, and a circumference removed from the surface of the said rectangular projections of the said drum so as to turn therein, a plurality of discs having a circular opening loosely fitting over and turning on the circular section of the said tube and having at its circumference projections fitting to the said rectilinear projections of the said drum so as to allow only a side movement therein, the two sets of discs being arranged alternately on the said oblong tube within the said drum, and a spring arranged round the said main driving shaft at that side of the said common hub opposite to the said drum and so adapted that it presses this hub and the said drum against the said discs, and the latter against each other and the side of the said gear wheel fixed to the said main driving shaft and, by the friction thus caused, attaches the said gear wheel and sprocket wheel to the said main driving shaft with such a force as to transmit to the said counter shaft the maximum of power required by the tilting gear of the machine.

GUSTAV BERNHARD EGGERT.